United States Patent [19]

Fushimi

[11] Patent Number: 5,339,424
[45] Date of Patent: Aug. 16, 1994

[54] SYSTEM AND METHOD FOR COMPILING AND EXECUTING A COMPUTER PROGRAM WRITTEN IN MORE THAN ONE PROGRAMMING LANGUAGE

[75] Inventor: Shinya Fushimi, Kanagawa, Japan

[73] Assignee: Mitsubishi Denki Kabushiki Kaisha, Tokyo, Japan

[21] Appl. No.: 869,957

[22] Filed: Apr. 17, 1992

[30] Foreign Application Priority Data

Apr. 19, 1991 [JP] Japan .................. 3-088435

[51] Int. Cl.$^5$ ............................................. G06F 9/45
[52] U.S. Cl. ...................... 395/650; 364/DIG. 1; 364/280.4; 364/282.1
[58] Field of Search ............ 364/DIG. 1 MS File; 395/600, 650

[56] References Cited

U.S. PATENT DOCUMENTS

| | | | |
|---|---|---|---|
| 4,205,371 | 5/1980 | Feather | 364/DIG. 1 |
| 4,734,854 | 3/1988 | Afshar | 364/DIG. 1 |
| 4,894,771 | 1/1990 | Kunii et al. | 364/DIG. 1 |
| 4,961,133 | 10/1990 | Talati et al. | 364/DIG. 1 |
| 5,117,349 | 5/1992 | Tirfing et al. | 364/DIG. 1 |

FOREIGN PATENT DOCUMENTS 0373132 11/1988 European Pat. Off.
WO91/20030 12/1991 World Int. Prop. O.

OTHER PUBLICATIONS

Chamberlin et al., "Support for Repetitive Transactions and AD-HOC Query in System R", IBM Research Report, May 22, 1979.

*Primary Examiner*—Thomas M. Heckler
*Attorney, Agent, or Firm*—Wolf, Greenfield & Sacks

[57] ABSTRACT

A program processing system for processing a program including a first program division written in a first programming language and a second program division written in a second programming language comprises an operating system 100, a program processor 200 for compiling the first and second program divisions to produce first and second modules, and registering the second module by using an identifier assigned by the operating system when the first module is registered, and a program executor 300 for retrieving the second module by using the identifier assigned to the first module and executing the second module while executing the first module. This obviates generation of unnecessary identifiers and simplifies system configuration.

19 Claims, 10 Drawing Sheets

*Fig. 1*

(PRIOR ART)

```
getmaxincome( )
{
    int     maxincome;
    int     minincome;
    ┌─────────────────────────┐
    │ sqlexec(11)             │ 56
    └─────────────────────────┘
    print("max income is", maxincome);
    ┌─────────────────────────┐
    │ sqlexec(12)             │ 56
    └─────────────────────────┘
    print("min income is", minincome);
}
```

```
getmaxincome ( )
{
    int     maxincome ;
    int     minincome ;
    exec sql
        select max(s. income) into :maxincome
        from    s
        where s. income<100
    end exec
    print ("max income is", maxincome );

exec sql
        select min (s. income) into :minincome
        from    s
        where s. income>200
    end exec
    print ("min income is", minincome );
}
```

```
getmaxincome( )
{
        int     maxincome ;
        int     minincome ;

sqlexec(getfid( ), 0, prog[0])                    26 print("max income is", maxincome );
                                                          26
        sqlexec(getfid( ), 1, prog[1])

print("min income is", minincome );
} char prog[ ][ ] = {
        "select max(s. income) into : maxincome
        from    s
        where   s. income < 100",
        "select min(s. income) into : minincome
        from    s
        where   s. income > 200"
};
```

Fig. 10

SYSTEM AND METHOD FOR COMPILING AND EXECUTING A COMPUTER PROGRAM WRITTEN IN MORE THAN ONE PROGRAMMING LANGUAGE

BACKGROUND OF THE INVENTION

1. Field of the Invention

The present invention relates to a program processing system and its processing method. More particularly, this invention is concerned with a system for processing a database processing application program created by embedding a database processing program written in SQL or other database processing language into a program written in COBOL, FORTRAN, or another general-purpose programming language.

2. Description of the Related Art

Figure 1:
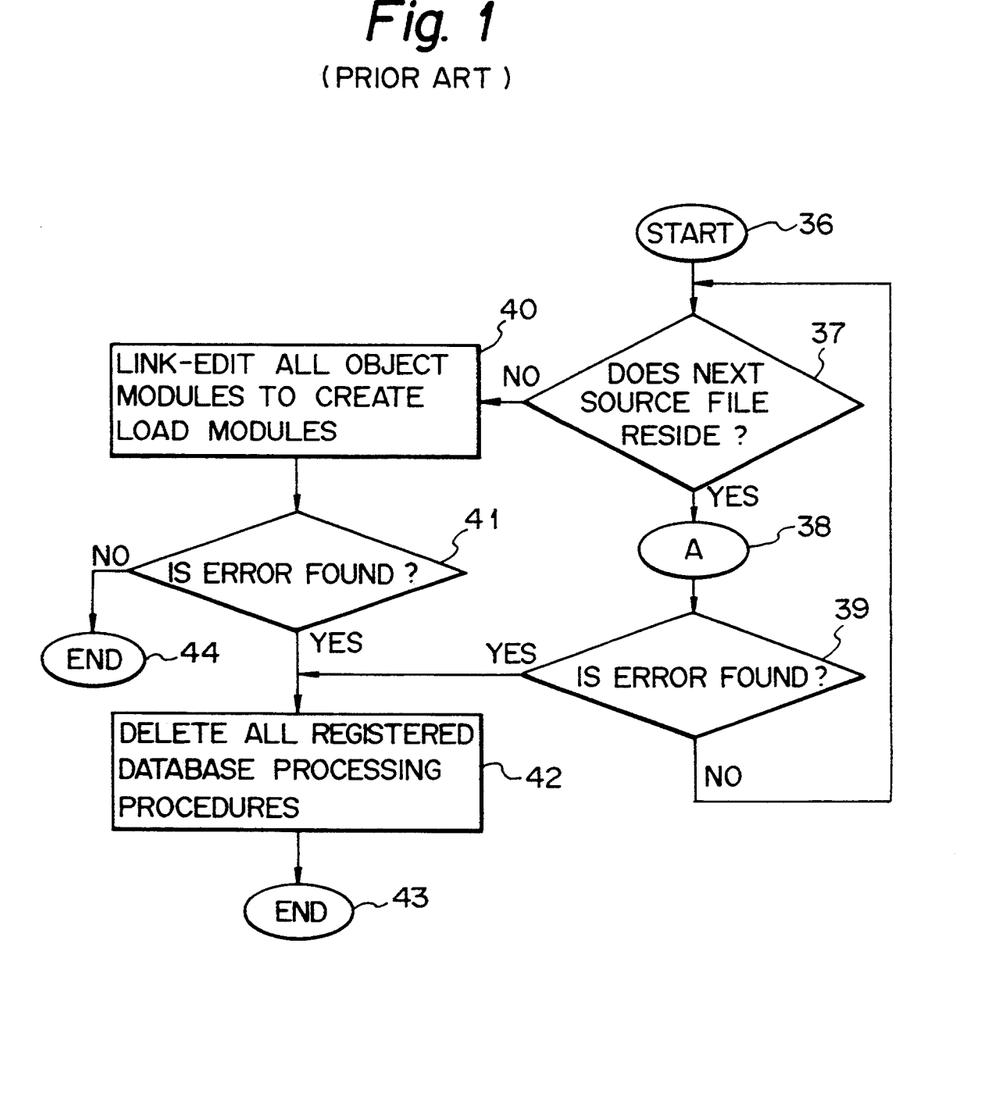
FIG. 1 is a flowchart showing a compilation mode in a conventional database program processing system.
Figure 2:
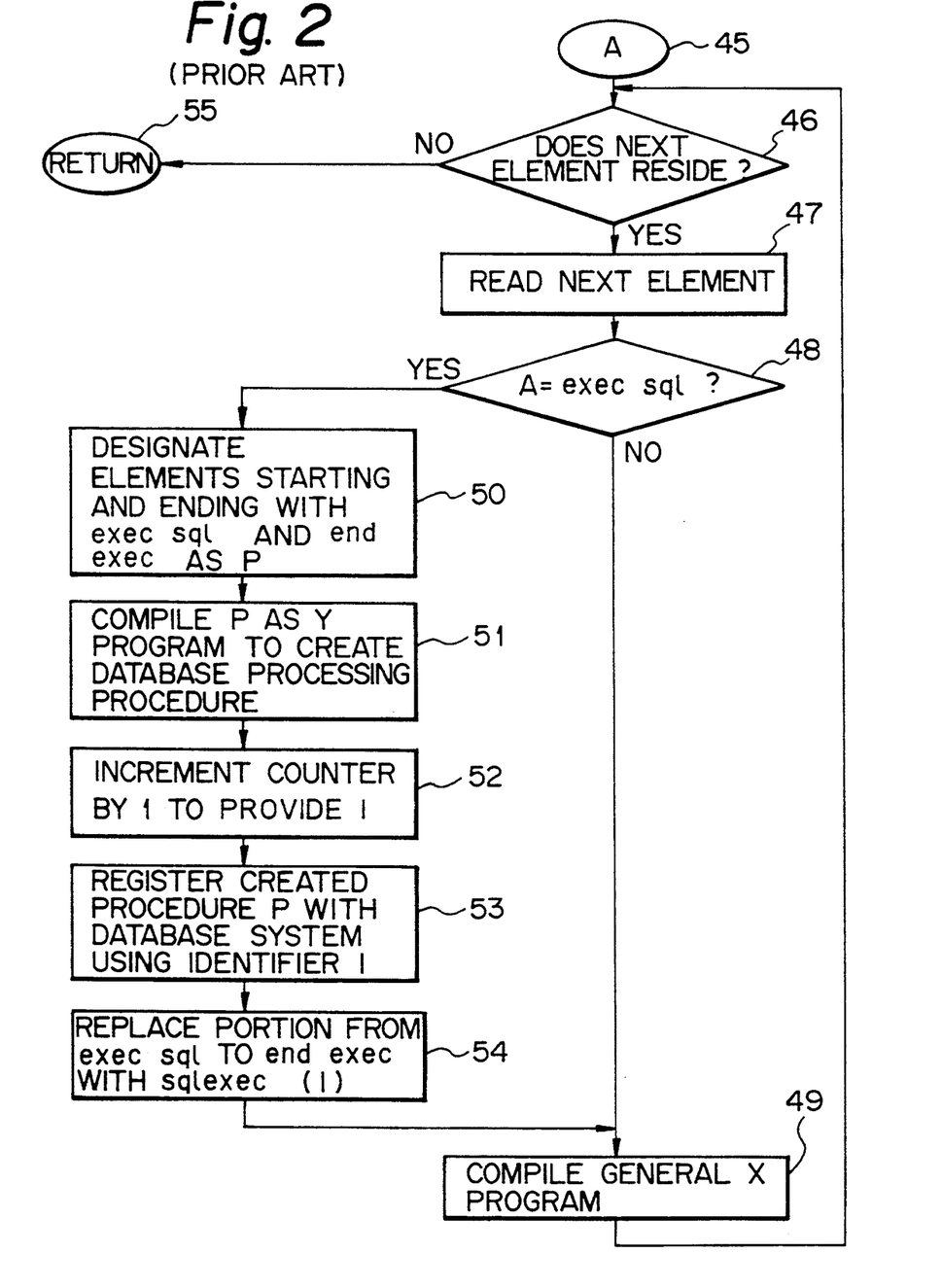
FIG. 2 is a flowchart showing a compilation mode in a conventional database program processing system.
Figure 3:
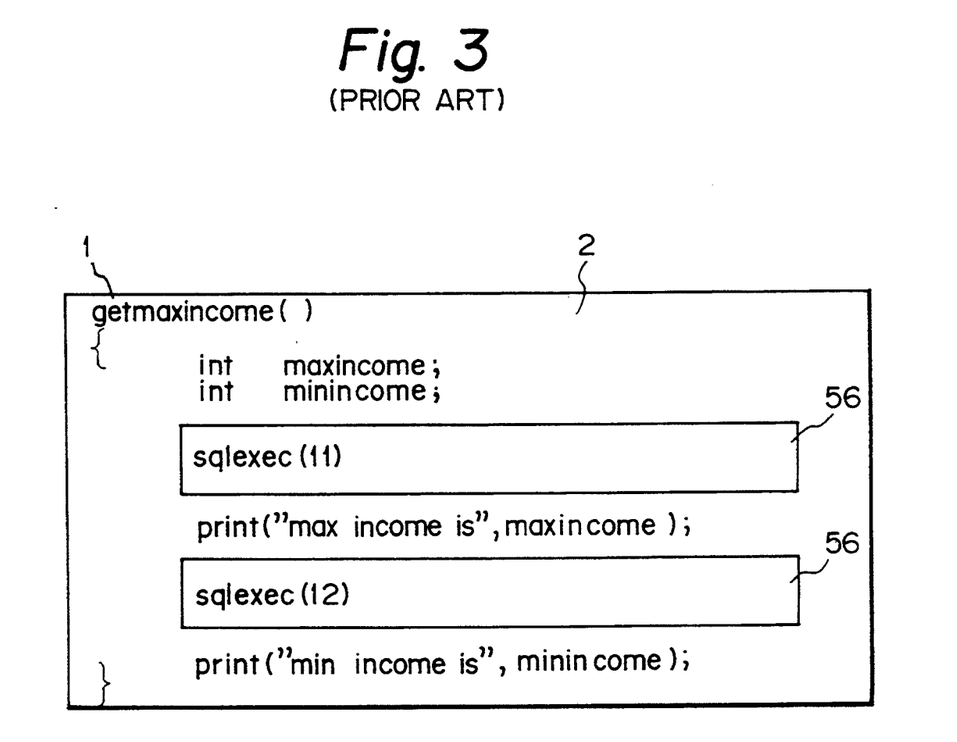
FIG. 3 is an explanatory diagram of a compilation result of an example shown in FIG. 5 using a conventional system.
Figure 4:
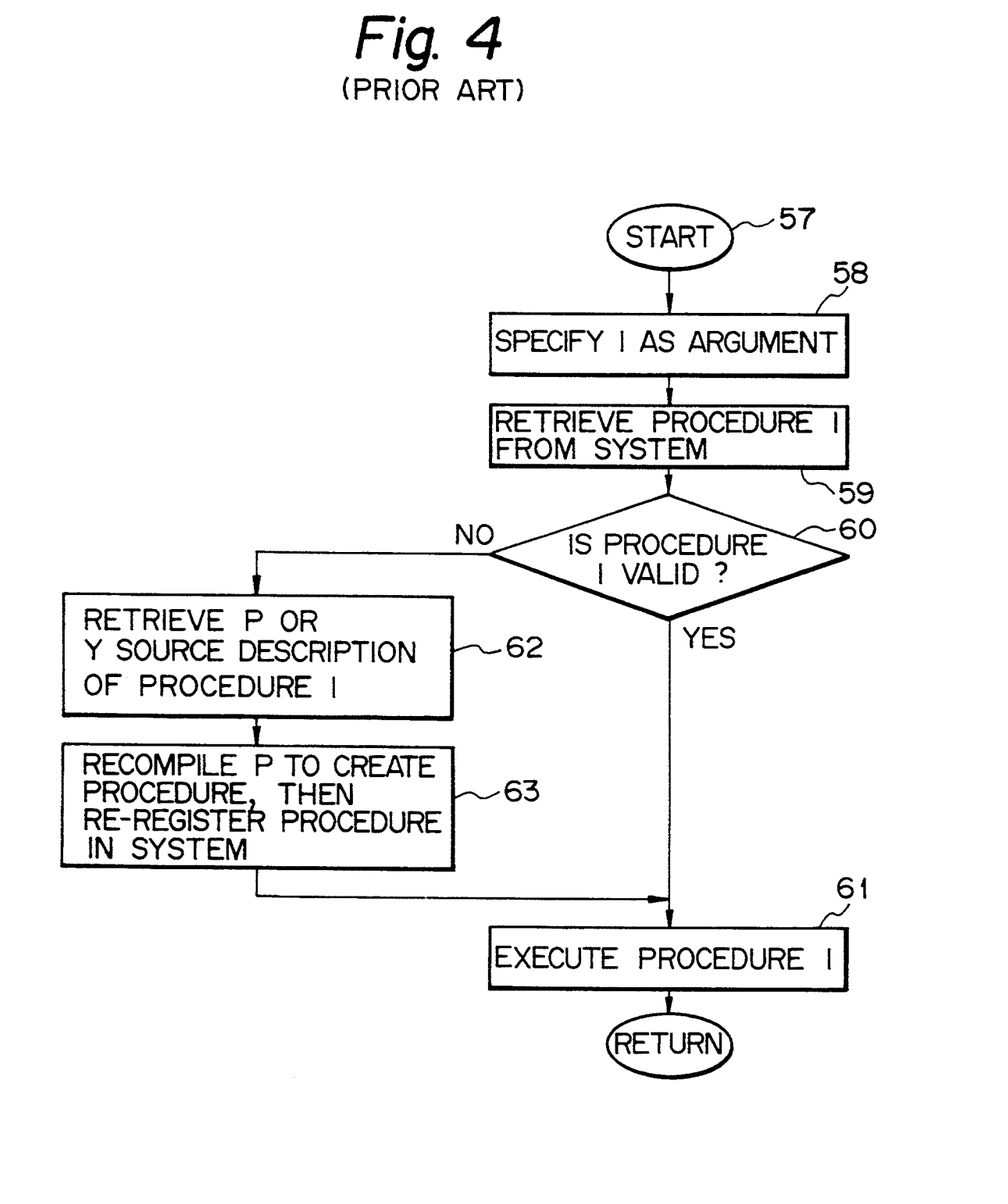
FIG. 4 is a flowchart showing a portion for executing database processing in a conventional program processing system.
Figure 5:
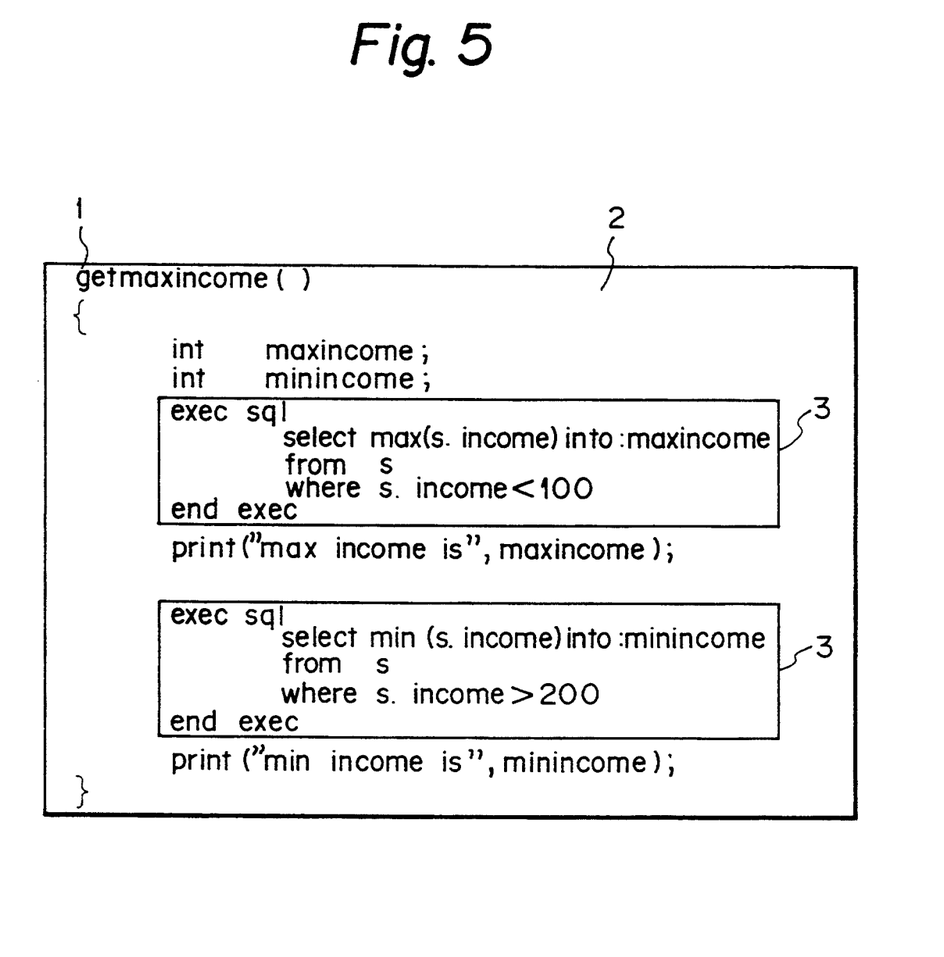
FIG. 5 shows an example of a program for explaining the present invention and a conventional program processing system.

FIGS. 1 and 2 are flowcharts showing the source program compilation procedure in a conventional database processing system. FIG. 3 shows a compilation result of a source program. FIG. 4 is a flowchart showing the operation of the database processing request procedure required for executing a database processing program including compiled procedures. FIG. 5 shows an example of a database processing program used for explanation.

A general-purpose programming language used to write a database processing program shall be X, and a database processing language, Y. In FIG. 5, 1 denotes a database processing program. 2 is a portion of the database processing program which is written in X, and 3, a portion written in Y. Herein, the Y portion starts and ends, for easy understanding, with "exec sql" and "end exec". In this form, the portion is embedded in a program written in X. The program shown in FIG. 5 retrieves a maximum income from a table s containing data under the condition that the income does not exceed 100, assigns the value to a variable, "maxincome", then outputs the result to a terminal. Then, the program retrieves a minimum income from the table s containing data under the condition that the income exceeds 200, assigns the value to a variable, "minincome", then outputs the result to the terminal.

When a source code of a database processing program is entered, the program is compiled according to the operation shown in FIGS. 1 and 2. First, at a step 36, the operation starts. At a step 37, it is determined whether a source file to be compiled still resides. If it resides, processing A shown in FIG. 2 is executed at a step 38.

In the processing A, the operation starts at a step 45. It is determined at a step 46 whether any element to be processed still resides. If it does not reside, the A returns to the caller at a step 55. If an element resides, it is read at a step 47. At a step 48, it is determined whether the read element is "exec sql". If it is not "exec sql", the element is passed to a general X compiler, then compiled as an X program. Then, the operation returns to the step 46.

If the read element is "exec sql", the subsequent elements ending with "end exec" forms the Y program. This portion is designated as P at a step 50. At a step 51, the P is compiled to create an actual database processing procedure. Registered procedures are assigned mutually-different identifiers I so that they can be identified. The system, therefore, has a counter for generating the identifiers. Every time a procedure is created, the counter is incremented by 1 at a step 52 to provide a different identifier. The identifier is represented as I. At a step 53, the procedure and P as well as the identifier I are registered with the system.

Next, at a step 54, the generated identifier I of the procedure is used as an argument to create a description of an X procedure call for invoking a general-purpose procedure (herein "sqlexec") which activates precompiled database processing. FIG. 3 shows an example of a result of converting an example of FIG. 5 according to the procedure. In this example, two Y descriptions 3 are compiled to create procedures having procedure identifiers 11 and 12, and converted into X general-purpose procedure calls "sqlexec".

Finally, the thus-converted general-purpose procedures "sqlexec" are compiled as X program descriptions by an X compiler at a step 49.

The above operation continues until no element is found in the source file. At last, the operation is returned to the caller at a step 55. When the operation is returned, the general program division of the source file is stored as an object module in a file by the X compiler. The database processing division as well as its source description are registered in a database processing procedure registration area of the system. In addition, information indicating whether an error is detected during compilation is retained.

After that, the operation returns to the step 39. Then, it is determined whether an error is detected during compilation of the source file. If an error is found, all database processing procedures registered so far are invalidated. At a step 42, the procedures are deleted. The whole compilation procedure terminates with an error at a step 43. If no error is found, the operation returns to a step 37. Then, the next source file is handled. If no source file resides, object modules of general program divisions are link-edited at a step 40. If an error is detected in this process, all the database processing procedures are deleted at the step 42. The whole compilation procedure terminates with an error at the step 43. If link editing terminates normally, a sequence of compilation processes terminates normally at a step 44.

Next, an execution system for a thus-compiled database processing program will be explained.

A database processing program starts the operation as a program written and compiled by general X. As execution proceeds, if "sqlexec" is invoked, database processing is carried out based on the logic shown in FIG. 4. That is, "sqlexec" starts execution at a step 57, and retrieves a database processing procedure having a procedure identifier I given as an argument at a step 59. At a step 60, it is determined whether the procedure retrieved is valid. If the procedure is valid, the procedure is executed at a step 61. Then, the operation is returned to the caller. If the procedure has been invalidated for some reason, a source description P pointed to by the I is retrieved from a database processing procedure registration area in the system at a step 62. At a step 63, the P is dynamically recompiled as a Y description to re-create a valid database processing procedure. Then, the I is re-registered as an identifier in the system. The database processing procedure is executed as a step 61.

A registered database processing procedure becomes inoperative and invalid if, for example, the indexes structure of data which the procedure uses is deleted.

The database processing system of the prior art provides the aforesaid operations, posing the problems below.

(1) A database processing program is recompiled many times during debugging, but an executable load module is not created every time. Therefore, identifiers of database processing procedures are consumed extravagantly and used up for a limited period of time. When an attempt is made to cope with this problem, the operation of a database management system becomes complex. Besides, procedures which have already been registered must be deregistered frequently because of errors deriving from other causes. Since a database processing procedure registration area is subject to exclusive control, contention occurs among object-time procedure retrieval, and compile-time procedure registration and deregistration. This causes system performance to deteriorates remarkably.

(2) A registered procedure is assigned a procedure identifier unique to a system under which the procedure is compiled. The procedure identifier of the procedure may be used in another procedure in another system. The procedure, therefore, cannot be executed without any change to its source code. A program written in a conventional general-purpose programming language can be freely transferred between machines of the same type merely by moving load modules. This is not true for database processing programs. To transfer a database processing application program to another system, all source programs must be moved to and recompiled under the system. Thus, it is very difficult to transfer a database processing application program from system to system.

SUMMARY OF THE INVENTION

The present invention intends to solve the foregoing problems. More particularly, unique identifiers are assigned to database processing procedures without using a system-specific counter, thus preventing the operating procedure of a database management system from being complex because of rapid consumption of counter values. Unnecessary procedures are not registered to reduce contention among object-time procedure retrieval, and compile-time procedure registration and deregistration, and eventually improve system performance. Thus, the aforesaid problem (1) will be solved.

A database processing program can be transferred to another system merely by moving load modules alone, wherein source files need not be recompiled. This provides a solution for the aforesaid problem (2).

A program processing apparatus according to the present invention handles a program including a first program division written in a first programming language and a second program division written in a second programming language, comprising:
(a) an operating system for managing files and modules by using identifiers, and controlling execution and processing of programs;
(b) a program processor for compiling the first program division and the second program division of the program to create a first module and a second module, and registering the second module by using an identifier which is assigned by the operating system when the first module is registered; and
(c) a program executor for executing the first module, and retrieving the registered second module according to the identifier assigned to the first module for execution while executing the first module.

According to the present invention, a program processing method for compiling and editing a source program including a first program division written in a first programming language and a second program division written in a second programming language, comprises:
(a) a first compilation step of compiling the first program division to create a first module;
(b) a second compilation step of compiling the second program division to create a second module, and providing the first module with reference information for referencing the second module with an identifier assigned to the first module; and
(c) an editing step of editing the first module to register it with an operating system, and registering the second module with the operation system so that the second module can be referenced according to the identifier assigned to the first module by the operating system.

According to the present invention, a program processing method for handling a program including a first program division written in a first programming language and a second program division written in a second programming language, comprises at least:
(a) a compilation editing step of compiling the first program division to create a module and holding the second program division in the module; or
(b) an execution step of executing a module, and converting the second program division into an executable format for execution while executing the module.

In a program processing system according to the present invention, identifiers which an operating system assigns to files or modules are employed so that reference can be made from a first module to a second module. Identifiers which the operating system assigns are unique within the system. Using the identifiers, files or modules inside the system will not be indistinguishable from others.

A program processor compiles and registers a first program division and a second program division so that a second module can be invoked with an identifier assigned to a first module. Then, a program executor retrieves the second module according to the identifier assigned to the first module while executing the first module, then executes the second module. This obviates conventional counter control, resulting in a simple system operating procedure.

In a program processing method according to the present invention, identifiers which an operating system assigns to files or modules are employed, and source programs are compiled to create executable modules. First, a first compilation process is implemented to compile a first program division and create a first module. A second compilation process translates a second program into a second module, references the first module to find the identifier of the first module, and provides the first module with reference information for referencing the second module. An editing process registers the first module with the operating system to obtain an identifier, and then registers the second module so that the second module can be referenced later with the identifier.

Thus, an executable module is generated. Unlike in a conventional method, a counter need not be referenced. While the first module is being executed, reference information contained in the first module is used to retrieve the second module, and then the second module is executed.

In a program processing system and its method according to the present invention, an identifier of a first module which an operating system assigns uniquely within a system is used to retrieve a second module for execution. This prevents unnecessary registration and provides a simple system operating procedure.

In a program processing method according to the present invention, a module can be executed on another system. A compilation editing process compiles and edits a first program division to create a module, and holds a second program division in the module with its source description unchanged. An execution process converts the second program division into an executable format at once, if necessary, and executes it while executing the module. This means that the second program division of a module can be executed within the first program division. Consequently, modules can be transferred to other systems.

In a program processing method according to the present invention, when a module is created, a portion which will be required after the module is transferred to other system is appended to the module. This permits creation of a module executable on other system to which the module is transferred.

DETAILED DESCRIPTION OF THE PREFERRED EMBODIMENTS

Embodiments of the present invention will be described in conjunction with FIGS. 6, 7, 8, 9, and 10. Herein, a program shown as an example (FIG. 5) of a database processing program used for explaining the prior art will be used to explain the operations.

Figure 6:
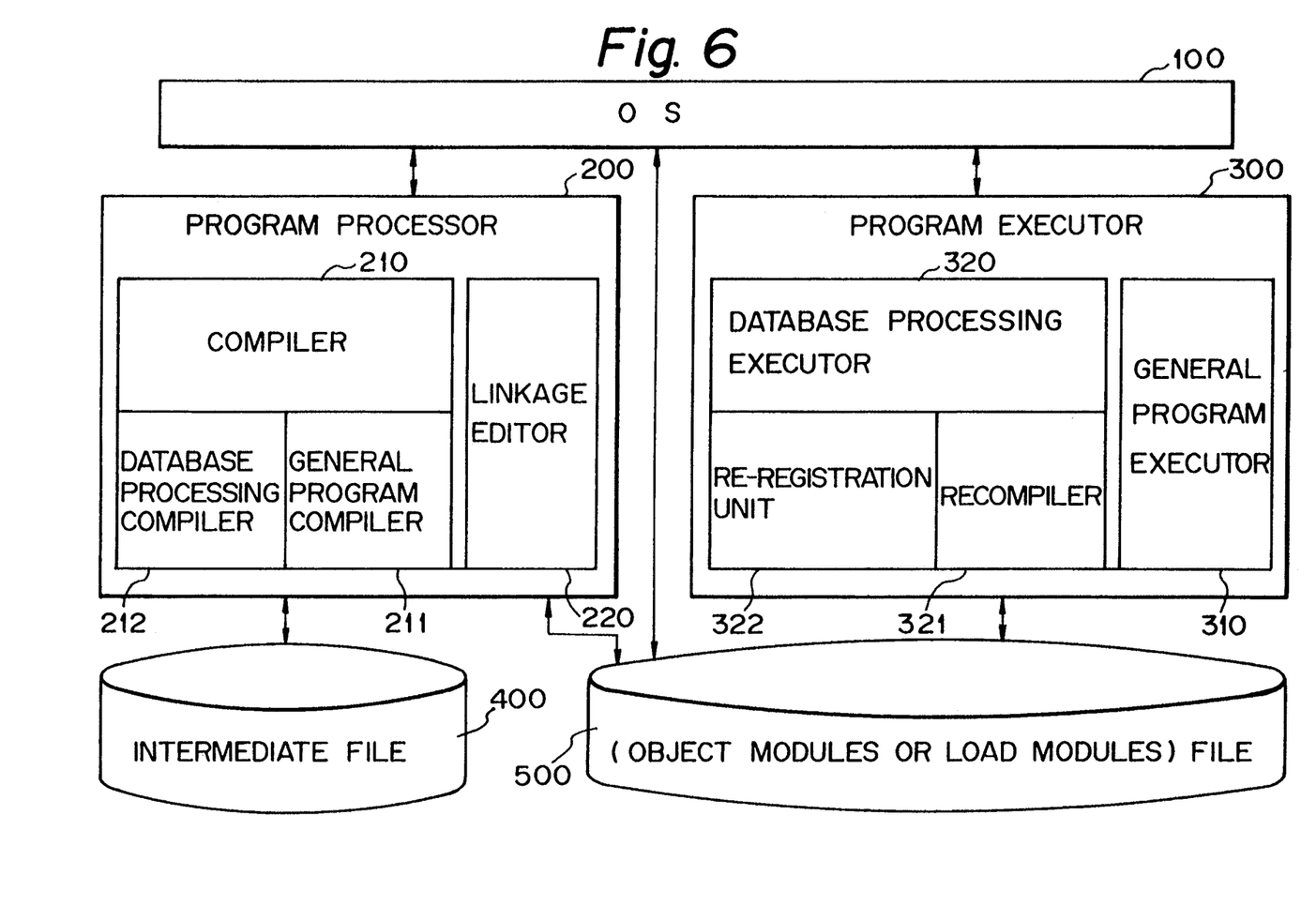
FIG. 6 shows an embodiment of a program processing system for explaining a program processing apparatus according to the present invention.

FIG. 6 is a block diagram of a program processing system according to the present invention. 100 denotes an operating system (hereafter, OS) for controlling compilation editing process of programs or execution of programs and managing by using identifiers source programs, object modules, load modules, and other program-related modules, and data files containing data. 200 denotes a program processor running under the OS to compile and edit programs, and 300, a program executor running under the OS 100 to execute programs.

In the program processor 200, 210 denotes a compiler for compiling programs, and 220, a linkage editor for editing programs. 211 denotes a general program compiler, and 212, a database processing compiler for compiling database processing program divisions.

In the program executor, 310 denotes a general program executor, and 320, a database processing executor for executing database processing program divisions. 321 denotes a recompiler for recompiling database processing program divisions, and 322, a re-registration unit for registering database processing programs which the recompiler 321 has recompiled, in the OS 100.

400 is an intermediate file which the database processing compiler 212 of the program processor 200 uses. 500 is a file which the OS 100, program processor 200, or program executor 300 uses.

Figure 7:
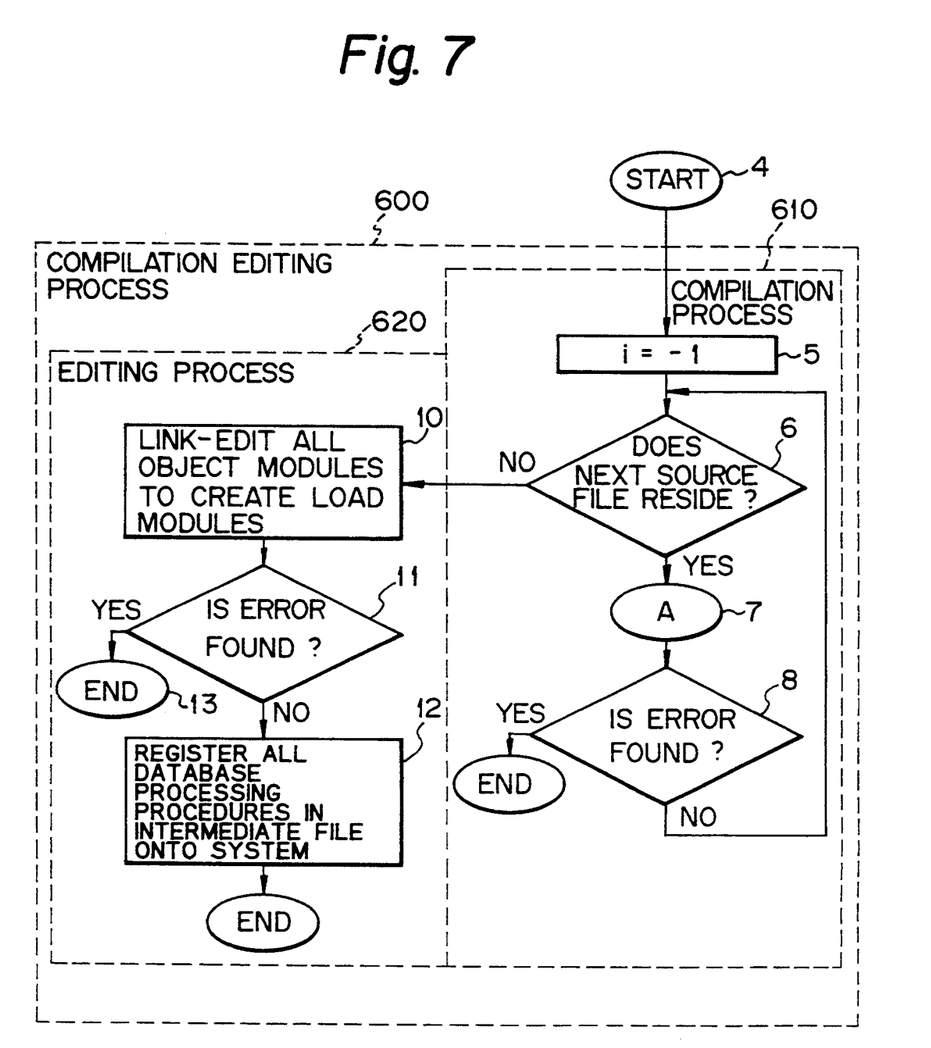
FIG. 7 is a flowchart showing a compilation editing process of a program processing method according to the present invention.
Figure 8:
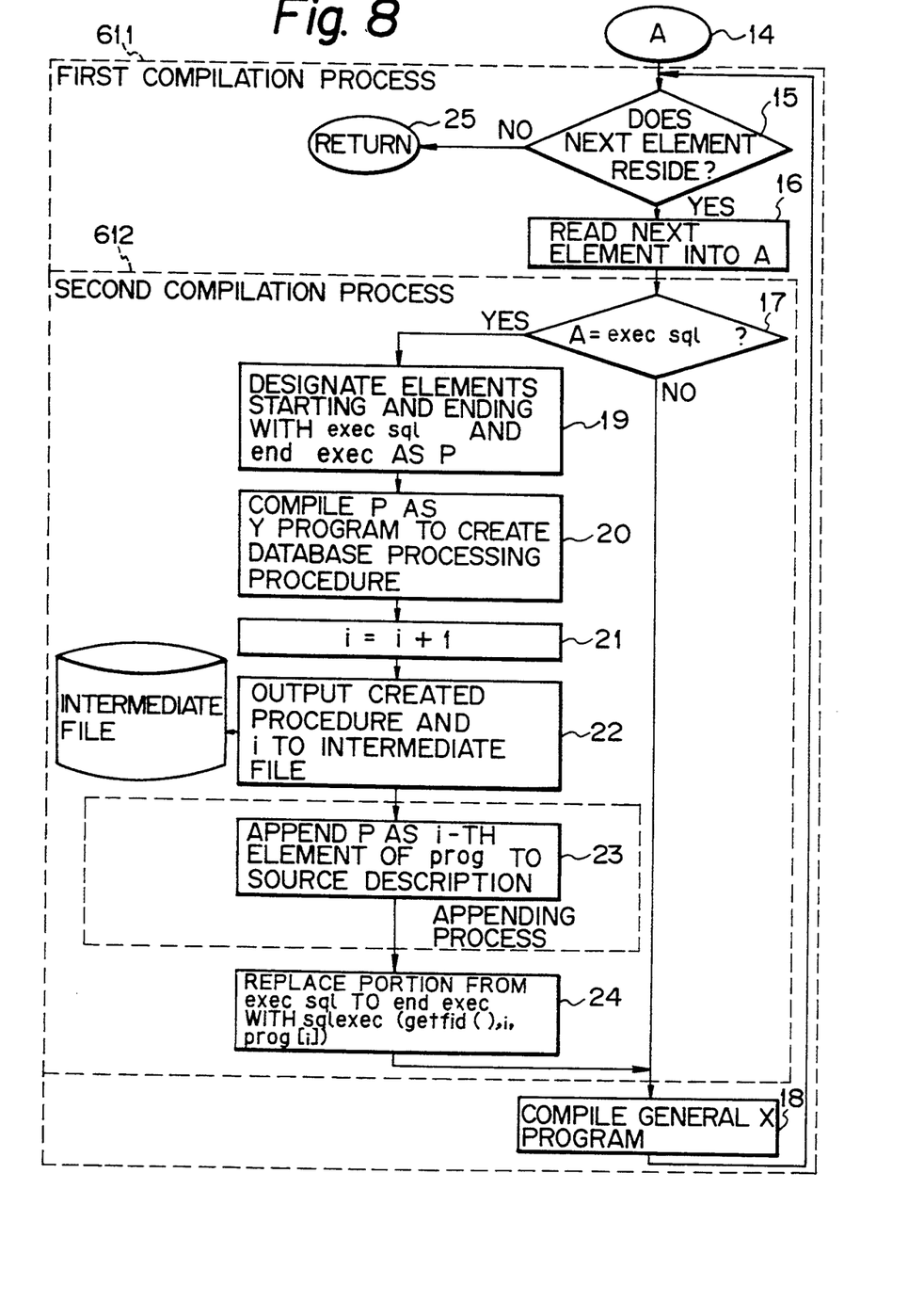
FIG. 8 is a flowchart showing first and second compilation processes of a program processing method according to the present invention.
Figure 9:
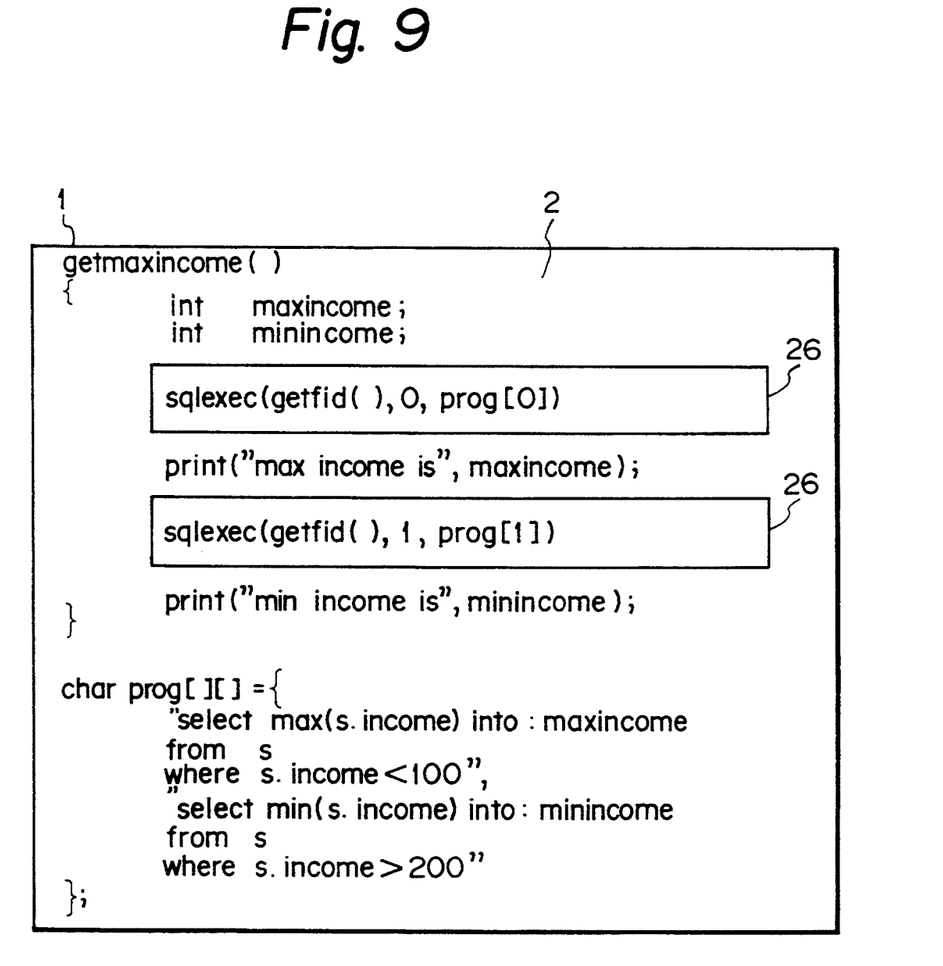
FIG. 9 is an explanatory diagram of a compilation result of an example shown in FIG. 5 using an embodiment of the present invention.
Figure 10:
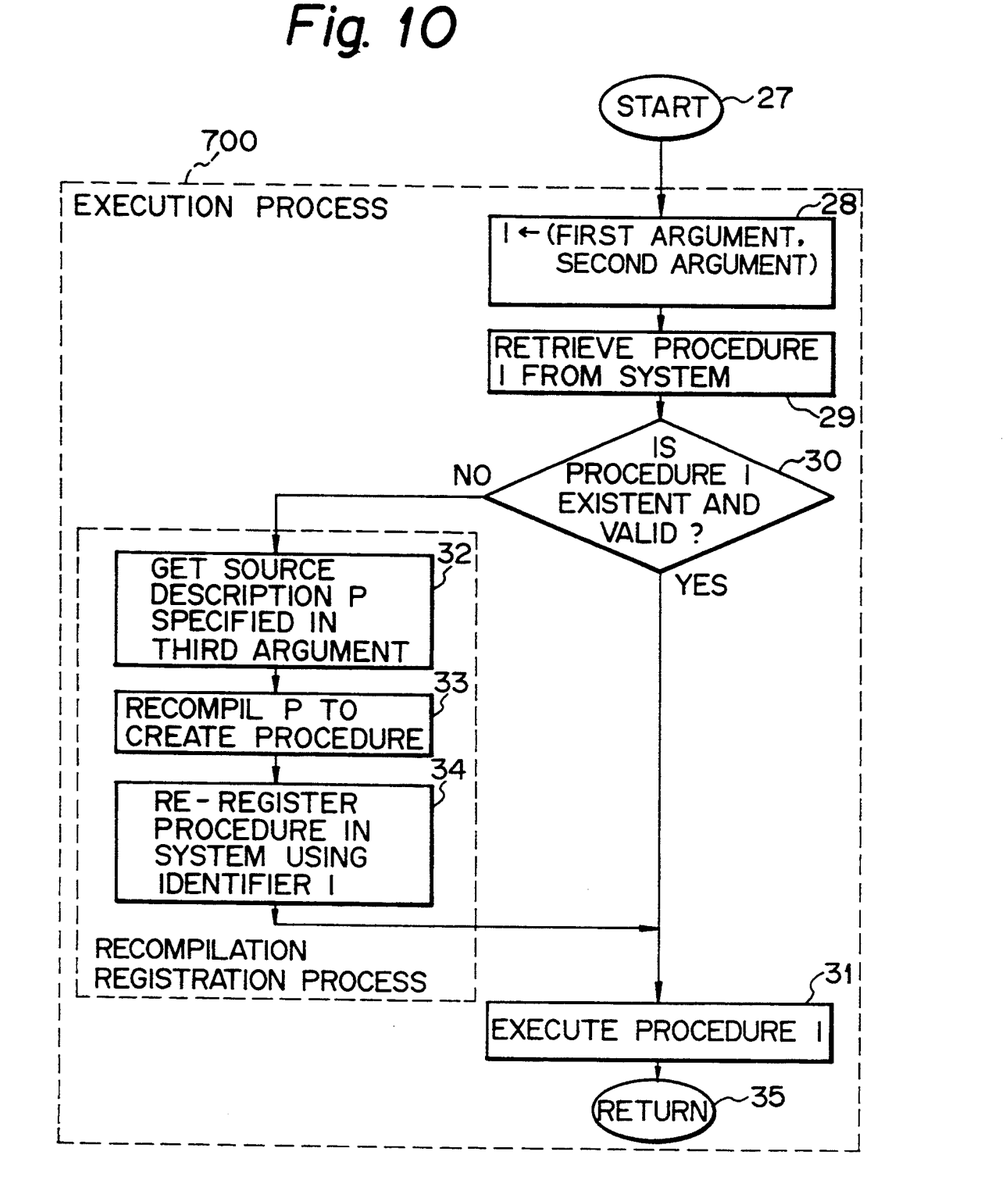
FIG. 10 is a flowchart showing an execution process of a program processing method according to the present invention.

FIGS. 7 and 8 are flowcharts showing a source program compilation procedure of a program processing method according to the present invention. FIG. 9 shows a source program representing a compilation result. FIG. 10 is a flowchart showing the operation of a database processing request procedure required for executing a database processing program including compiled procedures.

In FIG. 7, 600 denotes a compilation editing process which the program processor 200 executes. 610 is a compilation process in the compilation editing process, and 620, an editing process. In FIG. 8, 611 denotes a first compilation process in the compilation process 610, and 612, a second compilation process. In FIG. 10, 700 is an execution process which the program executor 300 executes.

In FIG. 5, 1 indicates a source program, and 2, a first program division expressed in a first programming language. In this case, the first programming language is a general-purpose programming language X. 3 indicates a second program division expressed in a second programming language. In this case, the second programming language is a database processing language Y.

Next, operations will be described.

When a source code of a database processing program is entered, a program processor 200 operates to compile the program as shown in FIGS. 7 and 8. First, the operation starts at a step 4. At a step 5, a counter i whose value is provided as a relative database processing procedure identifier which is exclusively for the compilation is initialized to −1. The system is provided with the counter i which is valid exclusively during the compilation period, and generates relative identifiers. Every time a procedure is created, the counter is incremented by 1 to provide a different relative procedure identifier. Next, it is determined at a step 6 whether a source file to be compiled still resides. If it resides, processing A shown in FIG. 8 is executed at a step 7.

The processing A comprises a first compilation process 611 and a second compilation process 612. The first compilation process 611 compiles a first program division to create a first object module. The second compilation process 612 compiles a second program division to create a second object module, and provides the first object module with a call statement for referencing the second object module by using an identifier assigned to the load module of a program.

That is to say, the processing A starts up at a step 14, and determines at a step 15 whether an element to be processed still resides. If the element does not reside, the A returns to the caller at a step 25. If it resides, the element is read at a step 16. At a step 17, it is determined whether the read element is "exec sql". If the read element is not "exec sql", the element is passed to a general compiler for a general-purpose programming language X, and then is compiled as an X program. Then, the operation is returned to the step 15.

If the read element is "exec sql", the subsequent elements ending with "end exec" are identified as a program written in a database processing language Y. At a step 19, this portion is designated as P. Next, the P is compiled to create an actual database processing procedure at a step 20. At a step 21, the i is incremented by 1 to generate a new relative identifier. At a step 22, the procedure is placed temporarily in an intermediate file 400 together with the identifier or the i value. At the next step 23 (appending process), the P is appended as an i-th value of a character string variable, "prog", directly to the source program. At a step 24, a system procedure (getfid()) for getting file identifiers of load modules existent on an OS, an i value of a generated relative procedure identifier, and an address of an i-th element of "prog" are used as arguments to create a description of an X procedure call for invoking a pre-compiled general-purpose procedure (herein, "sqlexec") for activating database processing. This description replaces the elements starting with "exec sql" and ending with "end exec". FIG. 9 shows an example of a result of converting an example of FIG. 5 using the foregoing procedure. In this example, two Y descriptions 3 in FIG. 5 are compiled to create procedures having relative procedure identifiers 0 and 1, and are converted to X general-purpose procedure calls, "sqlexec".

Finally, at a step 18, the thus-converted general-purpose procedures "sqlexec" are compiled as X program descriptions by an X compiler.

The aforesaid operation continues until no element is found in the source file. Eventually, the operation is returned to the caller at a step 25. When the operation is returned, the compiled result of the general program division of the source file is stored as an object module in a file by the X-compiler. The compiled result of a database processing division is placed in the intermediate file together with the relative identifier i. The source description of a database processing division is contained in the object module. In addition, information indicating whether any error is detected during the compilation is held.

After that, the operation returns to a step 8 shown in FIG. 7. It is determined whether an error is detected during compilation of the source file. If an error is found, database processing procedures registered so far are all invalidated. At a step 9, the whole compilation procedure terminates with an error. At this time, since the database processing procedures have not been registered in the system, it is unnecessary to execute a procedure for deleting database processing procedures from a system. If no error is found, the operation returns to the step 6. Then, the next source file is handled.

When a compilation process 610 terminates as described above, the program processor 200 passes the operation to a linkage editor 220. The linkage editor 220 edits first object modules of general program divisions to create a load module, and registers the module as a file in the OS 100. The linkage editor 220 also registers a second object module in the database processing procedure registration area so that the second object module can be referenced by using an identifier assigned to the load module.

The operation of the linkage editor 220 will be explained in conjunction with an editing process 620 shown in FIG. 7.

When a compilation process 610 is complete, an editing process 620 link-edits object modules of a general program division. As a result, load modules of the general program division are created and placed in a file 500. When the load modules are registered in the OS 100, the OS 100 assigns uniquely-identifying file identifiers to the load modules. The identifiers may be, for example, names of the load modules or numbers assigned to the load modules. Any lexical unit can be used as identifiers as far as modules can be defined uniquely within the system. However, the identifiers must be referenced by the aforesaid system procedure, "getfid()", for getting file identifiers.

If an error is detected in the process of creating a load module, the whole compilation procedure terminates with an error at a step 13. At this time, database processing procedures have not been registered in the system. Therefore, it is unnecessary to execute a procedure for deleting database processing procedures from the system. When the linkage editor terminates normally, the database processing procedures placed in the intermediate file are registered with procedure identifiers I in the system by using the file identifiers which have been already assigned by the OS 100 to the load modules and the relative identifiers i which have been used in the load modules. Then, the compilation editing process 600 terminates normally.

Next, an execution system for a database processing program compiled as described above will be explained in conjunction with an execution process 700 of FIG. 10.

A database processing program or a program written in a general X and compiled is executed by a program executor 300. As execution proceeds, when "sqlexec" is invoked, database processing is done based on the logic shown in FIG. 10. That is, a system procedure, "getfid()", is evaluated before "sqlexec" is executed, and then the file identifier of the load module existent on the OS is specified as the first argument of "sqlexec". The relative procedure identifier and the address of a source description of a Y database processing procedure area respectively specified as the second and third arguments. "sqlexec" starts execution at a step 27, specifies a combination of the first and second arguments of the three arguments as a procedure identifier I, and then retrieves a database processing procedure having the procedure identifier I as a step 28. At a step 30, it is checked if the retrieved procedure is valid. If the procedure is valid, the procedure is executed at a step 31. Then, the operation is returned to the caller at a step 35.

If the procedure does not reside in the system or does reside but has already been invalidated for some reason, a recompilation registration process 710 is caused to operate. The recompilation registration process 710 obtains a source description P specified in the third argument from its own load module at a step 32, and then dynamically recompiles the source description P as a Y description to recreate a valid database processing procedure at a step 33. The procedure is registered in the system at a step 34, and then is executed at a step 31. In the past, the recompilation has been executed by retrieving a source description P from a database processing procedure registration area. This has made recompilation possible within the same system but impossible after a source description is incorporated into any other system. However, in an embodiment according to the present invention, the source description P resides in its own load module. Therefore, the recompilation can be done on any other system. Moreover, when the recompilation result is registered in the system by using the I, execution can be done on the different system thereafter.

As described above, in the embodiment, there has been explained a database program processing system comprising:

means for creating object modules from a database processing application program which is described with source programs each comprising at least a general program division written in a general-purpose programming language and a database processing division written in a dedicated database processing language, by independently compiling the general program division and the database processing division for each source program, and for storing the object modules in a file;

means for creating executable load modules from the general program division under linkage editing operation, and for storing the load modules in the file;

means for registering the database processing division as executable database processing procedures in a database processing procedure registration area of a database management system in the system;

means for operating a database processing application by activating the load modules and, if necessary, invoking the database processing procedures registered in the database processing procedure registration area; and means for dynamically recompiling the database processing division, if the registered database processing procedures are unavailable or invalidated for some reason, and for re-registering the database processing procedures in the database processing procedure registration area for succeeding executions, the database program processing system being characterized by including:

means for assigning a file identifier on an operating system of the load modules and a relative identifier to the database processing division written in the database processing language, the file identifier corresponding to the general program division of the application program obtained when the database processing application is executed, and the relative identifier comprising a combination of relative-number values in the application program of the database processing division;

means for storing the database processing procedures in an intermediate file, without registering them in the database processing procedure registration area of the database management system in the system, when source files are compiled, means for registering all database processing procedures in the database processing application which are stored in the intermediate file, in the database processing procedure registration area, after the linkage editing operation of the general program division terminates normally; and means for retrieving the database processing procedure registration area with the general program, when the database processing is requested during execution, by using the file identifier on the operating system of the load module obtained during execution and the relative identifier comprising the combination of the relative-number values in the application program of the requested database processing division, so that an intended database processing division which has been registered in the database processing procedure registration area, is invoked from the general program division.

As explained in conjunction with the embodiment, a file identifier on an operating system of load modules invoking a procedure and an identifier comprising a combination of relative-number values in an application program of a database processing procedure are assigned to each database processing procedure. Since the file identifier of the load module is unique on the OS, overall identifiers of procedures become unique. That is, it is possible to assign unique identifiers of procedures, without assigning unique identifiers by counter values or the like which must be specifically managed in a system. Therefore, repeated compilation of a source program does not consume resources such as counter values.

According to the aforesaid embodiment, a file identifier on an operating system of load modules of an application program and an identifier comprising a combination of relative-number values in the application program of a database processing procedure are assigned to a database processing procedure written in a database processing language. It is possible, therefore, to assign unique identifiers of procedures only to a finally produced load module, without consuming resources such as counter values, even if a source program is compiled repeatedly. In addition, the produced database processing procedure can be stored in an intermediate file temporarily, and then be registered in a system after normal processing of a general program division and other divisions has been terminated and confirmed. It is possible, therefore, to reduce contention among object-time procedure retrieval, and compile-time procedure registration and deregistration, and hence to improve system performance.

Furthermore, in the embodiment, there has been explained a database program processing system in which, if a load module is transferred to another system, a source program of a database processing division is held in the load module corresponding to a general program division, the load module is executed on a destination database processing system, a database processing procedure corresponding to a database processing procedure registration area on the destination database processing system is retrieved by using an identifier of the database processing procedure. If no database processing procedure resides, the program of the database processing division in the load module is dynamically recompiled and is newly registered in a database processing procedure registration area of a destination system by using a file identifier of a destination load module and relative numbers of the database processing procedure. Then, the database processing division is rerun. Thus, a user need not recompile a database application program, and can implant a database processing application merely by moving the load modules.

Procedure identifiers defined as described above are used, and source program descriptions of database processing are held in a load module, not in a system, so that the load module is executed on a destination database processing system, and a database processing procedure corresponding to a database processing procedure registration area on the destination database processing system is retrieved by using the defined identifiers of the database processing procedure. If no database processing procedure resides, the program of the database processing division in the load module is dynamically re-compiled and is registered in a database processing procedure registration area of a destination system to further continue execution of the database processing division. Thus, a user need not re-compile a database application program, and can implant it only by means of the load module. In this case, the identifier of the database processing procedure is not a counter value of the like but a file identifier of the load module produced during execution on a system under which the application program is running. Therefore, the uniqueness of database processing procedures can be guaranteed.

In the aforesaid embodiment, a file identifier and a relative identifier i are used in combination as a procedure identifier I, and then the procedure identifier I is assessed to retrieve a database processing procedure (second module). If only one database processing division 3 written in a database processing language is present within a source program 1, or database processing divisions 3 are integrated at one point within a source program, the relative identifier i may not be used. In this second embodiment, the database processing procedure (second module) can be retrieved by assessing the file identifier.

In the aforesaid first embodiment, a source program 1 is written in a general-purpose programming language and a database processing language. Other programming languages will also so. A third embodiment, in which a source program comprises a first program division written in a first programming language and a second program division written in a second programming language, will also have the aforesaid advantages. A third program division written in a third programming language may be existent.

What is claimed is:

1. A system for compiling and executing a program, the program including a first program division written in a first programming language and a second program division written in a second programming language, the system using an operating system for managing modules by using identifiers and for controlling execution of the modules and comprising:
   (a) a program processor including:
      (i) means for compiling the program to produce, from said first program division and said second program division, a first module and a second module, and for obtaining an identifier assigned by the operating system to the first module, and
      (iii) means for registering the second module by using the identifier assigned by the operating system to the first module; and
   (b) a program executor including:
      (i) means for executing said first module,
      (ii) means for retrieving the registered second module by using the identifier assigned to said first module while executing said first module, and
      (iii) means for executing said second module.

2. A system for compiling a computer program having a first program division written in a first programming language and a second program division written in a second programming language, the system using an operating system which manages modules using identifiers and comprising:
   means for compiling the program to produce from said first program division and said second program division a first module and a second module, the first module having an identifier assigned by the operating system, and
   means for registering the second module by using the identifier assigned by the operating system to the first module.

3. A system for executing first and second program modules obtained from a program having a first program division written in a first programming language and a second program division written in a second programming language, the first module having an identifier assigned by an operating system which executes said first module, the second module being assigned an identifier which is dependent upon the identifier of the first module, the system including:
   means for executing said first module;
   means for retrieving the registered second module by using the identifier assigned to said second module, and
   means for executing said second module.

4. A system for compiling a source program including a first program division written in a first programming language and a second program division written in a second programming language, comprising:
   means for compiling said second program division to produce a second module,
   means for providing said first program division with reference information for referencing said second module by using a part of the identifier assigned to a first module obtained by compiling the first program division;
   means for compiling said first program division to produce the first module, and for obtaining the identifier to the first module from an operating system;
   means for registering said second module so that said second module can be referenced by using the identifier assigned to said first module.

5. A system for compiling and executing a program including a first program division written in a first programming language and a second program division written in a second programming language, comprising:
   means for compiling said first program division to produce a module,
   means for holding said second program division in the module; and
   means for executing said module, and
   means for converting said second program division into an executable format while executing said module.

6. A system for compiling a program including a first program division written in a first programming language and a second program division written in a second programming language, comprising:
   means for compiling the second program division to create a program module,
   means for editing the program so as to replace the second program division with a unique identifier to the program module,
   means for appending the program with a third program division written in the first programming language and designated in the first programming language as a constant and representative of the second program division, and means for compiling said edited and appended program to produce an executable module.

7. A system for compiling a program including a first program division written in a first programming language and a second program division written in a second programming language, comprising:
   means for appending the program with a third program division written in the first programming language and designated in the first programming language as a constant and representative of the second program division; and
   means for compiling said first and third program divisions, as a program division in the first programming language, to produce an executable module.

8. A system for compiling a program including a first program division written in a first programming language and a second program division written in a second programming language, comprising:
   means for compiling the second program division to obtain a program module;
   means for replacing the second program division in the program with reference information written in the first programming language and having a first identifier relative to the program;
   means for compiling the program in the first programming language to obtain a load module to which a second identifier is assigned by an operating system;
   means for registering the program module by using a third identifier comprising the first and second identifiers.

9. A method for compiling and executing a program including a first program division written in a first programming language and a second program division written in a second programming language, comprising the steps of:
   compiling the program to produce from said first program division and said second program division of said program a first module and a second module,
   obtaining an identifier assigned to the first module by an operating system,
   registering the second module by using the identifier assigned to the first module; and
   executing said first module,
   retrieving the registered second module by using the identifier assigned to said first module while executing said first module, and
   executing said second module.

10. The method of claim 9, wherein the identifier assigned to the first module by the operating system is an identifier used by the operating system during execution of the first module.

11. The method of claim 9, wherein the identifier assigned to the second module includes a procedure name which is executed to obtain the identifier used by the operating system during execution of the first module.

12. The method of claim 9, wherein the second module is stored in an intermediate file during compilation, and wherein the second module is registered after compilation of the program.

13. A method for compiling a computer program having a first program division written in a first programming language and a second program division written in a second programming language, comprising the steps of:
   compiling the program to produce from said first program division and said second program division of said program a first module and a second module,
   obtaining an identifier assigned to the first module by an operating system, and
   registering the second module by using the identifier assigned to the first module.

14. A method for executing first and second program modules obtained from a program having a first program division written in a first programming language and a second program division written in the second programming language, the first module having an identifier assigned by an operating system which executes said first module, the second module being assigned an identifier which is dependent upon the identifier of the first module, the method comprising the steps of:
   executing said first module,
   retrieving the registered second module by using the identifier assigned to said first module by the operating system while executing said first module, and
   executing said second module.

15. A method for compiling and editing a source program including a first program division written in a first programming language and a second program division written in a second programming language, comprising the steps of:
   compiling said second program division to produce a second module,
   providing said first program division with reference information for referencing said second module, said reference information comprising an identifier assigned by an operating system to a first module obtained by compiling the first program division;
   compiling said first program division to produce the first module and to obtain the identifier of the first module, and
   registering said second module so that said second module can be referenced by using the identifier assigned to said first module by the operating system.

16. A method for compiling and executing a program including a first program division written in a first programming language and a second program division written in a second programming language, comprising the steps of:
   compiling said first program division to produce a module,
   holding said second program division in the module, and
   executing said module, and
   converting said second program division into an executable format while executing said module.

17. A method for comprising a program including a first program division written in a first programming language and a second program division written in a second programming language, comprising the steps of:
   compiling said second program division to produce a program module,
   editing the program so as to replace the second program division with a unique identifier to the program module, and
   appending the program with a third program division written in the first programming language and designated in the first programming language as a constant and representative of the second program division; and compiling the edited and appended program to create an executable module.

18. A method for compiling a program including a first program division written in a first programming language and a second program division written in a second programming language, comprising the steps of:
  appending the program with a third program division written in the first programming language and designated in the first programming language as a constant and representative of the second program division; and
  compiling said first and third program divisions as a program division in the first programming language, to produce a module.

19. A method for compiling a program including a first program division written in a first programming language and a second program division written in a second programming language, comprising the steps of:
  compiling the second program division to obtain a program module;
  replacing the second program division in the program with reference information written in the first programming language and having a first identifier relative to the program;
  compiling the program in the first programming language to obtain a load module to which a second identifier is assigned by an operating system;
  registering the program module by using a third identifier comprising the first and second identifiers.

* * * * *